United States Patent [19]

Veronesi et al.

[11] Patent Number: 4,716,013

[45] Date of Patent: Dec. 29, 1987

[54] NUCLEAR REACTOR

[75] Inventors: Luciano Veronesi, O'Hara Twp., Alleghany Co.; Daniel C. Garner, Murrysville, both of Pa.

[73] Assignee: Westinghouse Electric Corp., Pittsburgh, Pa.

[21] Appl. No.: 828,553

[22] Filed: Feb. 7, 1986

Related U.S. Application Data

[63] Continuation of Ser. No. 490,099, Apr. 29, 1983, abandoned.

[51] Int. Cl.$^4$ .............................................. G21C 1/04
[52] U.S. Cl. ................................... 376/353; 376/399
[58] Field of Search ............... 376/292, 352, 353, 399, 376/401, 406

[56] References Cited

U.S. PATENT DOCUMENTS

| | | | |
|---|---|---|---|
| 2,982,713 | 5/1961 | Sankovich et al. | 376/353 |
| 3,849,257 | 11/1974 | Bevilacqua | 376/224 |
| 4,072,563 | 2/1978 | McDonald et al. | 376/353 |
| 4,092,216 | 5/1978 | Aubert | 376/399 |
| 4,173,513 | 11/1979 | Obermeyer et al. | 376/353 |

FOREIGN PATENT DOCUMENTS 3009937 9/1981 Fed. Rep. of Germany .
3009971 9/1981 Fed. Rep. of Germany .

OTHER PUBLICATIONS

Kuczera et al., *Back End Fuel Cycle Efficiencies for Improved Uranium Utilization*, International Conference on Nuclear Power Experience, Vienna, 13–17, Sep., 1982, p. 480.

Zeggel et al., *Fundamental Aspects of High Converting Pressurized Water Reactors*, International EHS/ANS Conference, Brussels, Apr. 26–30, pp. 203–207.

Hernies et al., *Uberlegurgen zur Modifizierbarkeib eines LHR Hinblick auf eine Bessere Uranausnutzung*, Johrestogung Kerutechnik Proc., 1981, pp. 953–956.

Zeggel et al., *Thermohydraulische und Konstruktine Randbedingungen eines Futgeschrittenen Abruckwasserreaktors*, Johrestagung Kerntechnik Proc., 1980, pp. 601–604.

Berger et al., Neutronenphysikalische Aspekte Eines Fortgeschrittenen Druckwasser Reaktors (FDWR), Atomkernenergiekerntechnik BD. 39 (1981) LFG. 2.

*Primary Examiner*—Deborah L. Kyle
*Assistant Examiner*—Richard W. Wendtland
*Attorney, Agent, or Firm*—D. C. Abeles

[57] ABSTRACT

Failure of the control-rod assemblies, particularly the control-rod guides and the WDRC's, by transverse flow of coolant through these members is prevented by directing the flow through a calandria above the guides. To avoid a high pressure drop in the coolant between the calandria and the outlet nozzles, the outlet nozzles are at the same level as the calandria. The calandria has hollow tubes between upper and lower supports. The length of the portion of the tubes between the supports is greater than the diameter of the outlet nozzles.

19 Claims, 7 Drawing Figures

NUCLEAR REACTOR

CROSS-REFERENCE TO RELATED APPLICATION

This application is a continuation of application Ser. No. 490,099 filed Apr. 29, 1983, now abandoned.

Application Ser. No. 490,101, filed concurrently herewith to James E. Kimbrell et al. for "Nuclear Reactor" (herein Kimbrell), and asigned to Westinghouse Electric Corporation, in incorporated in this application by reference.

Application Ser. No. 490,059, filed concurrently herewith to Luciano Veronesi for "Calandria" (herein Veronesi) and assigned to Westinghouse Electric Corporation, is incorporated in this application by reference.

BACKGROUND OF THE INVENTION

Kimbrell discloses a nuclear reactor including a calandria which is mounted above the upper internals. The control-rod drives are passed through the hollow members of the calandria. The coolant is conducted generally axially (vertically) through the upper internals and it flows transversely past the outer surfaces of the hollow members of the calandria. These hollow members are constructed to minimize the stresses produced by the transverse flow of the coolant notwithstanding that the velocity of the coolant may be high (40 ft./sec.). Failure of the guides in the upper internals and of any control rods or control-rod drives of the reactor is thus precluded. The calandria is at a substantially higher level of the reactor than the outlet nozzles.

While the Kimbrell nuclear reactor is on the whole satisfactory, its operation requires that after passing through the calandria, the coolant must flow through a relatively narrow channel between the calandria and the outlet nozzles. There is a substantial drop in the pressure of the coolant between the region where it leaves the calandria and the region where it flows out of the nozzles. In addition, there is substantial resistance to the inflow of cooling water through the outlet nozzles during an emergency. On the occurrence of a steam bubble, the steam would be collected in the reactor head and calandria and block the natural circulation of coolant through the core, calandria and outlet nozzles.

It is an object of this invention to overcome the above-described disadvantages of the Kimbrell reactor.

SUMMARY OF THE INVENTION

In accordance with this invention a nuclear reactor is provided in which there is no substantial pressure drop in the coolant between the calandria and the outlet nozzles. Specifically, the outlet nozzles are substantially at the level of the upper calandria. The calandria includes a plurality of vertical hollow members supported between upper and lower horizontal supports. The drive rods pass through, and are protected by, these hollow members. The coolant flows in through holes in the lower support. The portion of the hollow members between the supports has a length such that the outlet area through the outlet nozzles spans only hollow members and is not blocked by parts of the supports. These hollow members also have a length such that excessive non-uniform pressure distribution of the coolant is precluded. Such non-uniform pressure distribution produces undesirable non-uniformity of the coolant pressure in the core.

In nuclear reactors according to this invention, substantial losses in the outlet pressure of the coolant and outlet nozzle vortices are avoided. Nuclear reactors in which the inlet nozzles as well as the outlet nozzles are at the level of the calandria have additional advantages. The elevation of the coolant piping and specifically of the crossover leg; i.e, the leg between the steam generator and the primary coolant pumps, with respect to the core prevents core uncover for a high range of conditions of small breaks in the piping. The formation of a steam bubble does not preclude effective natural circulation when the primary coolant pump may be disabled. The steam bubble forms at the top and, in the Kimbrell reactor, would block the flow of coolant through the outlet nozzle. In the case of large breaks in the cold legs of the reactor, which cause reverse flow of coolant in the core, the large volume of coolant in the rod-guide region affords an additional measure of protection. The additional coolant permits prolonged core flow and effectively reduces the peak cladding temperature. During core reflood after blowdown a large static head exists on the coolant in the downcomer, i.e., the annulus through which the incoming accumulator flow passes, and this materially aids the core reflood rate.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF THE EMBODIMENT

Figure 1:
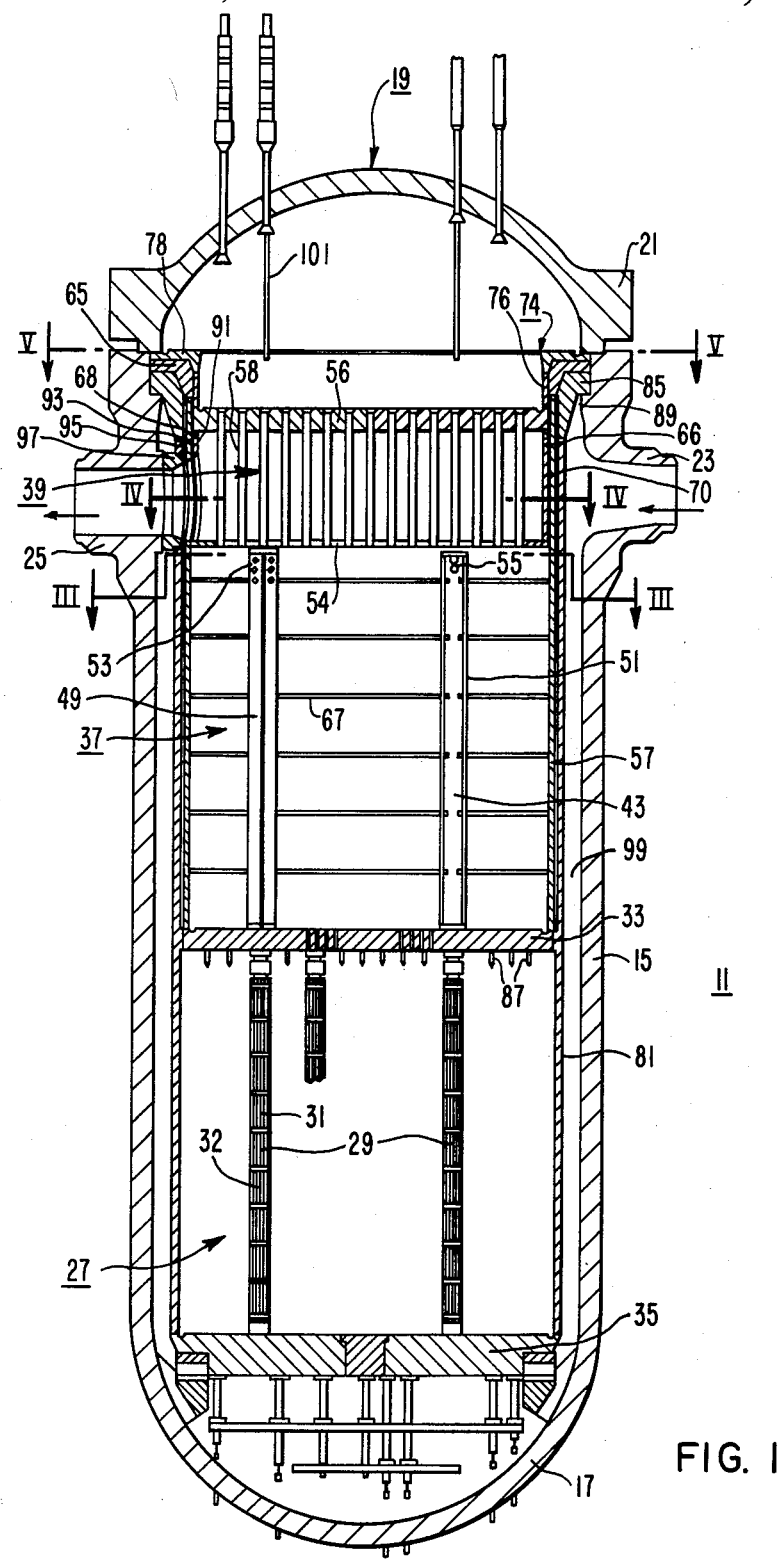
FIG. 1 is a view in longitudinal section of a sector of a nuclear reactor in accordance with this invention, the section being produced by planes, are passing through the longitudinal center line of the reactor and a center line of an inlet nozzle and the other through this longitudinal center line and a center line of the nearest outlet nozzle.

The apparatus shown in the drawings is a nuclear reactor 11 including a pressure vessel. The vessel includes a circularly cylindrical body 15 closed at the bottom by a hemispherical bowl 17. The vessel has a flanged dome-shaped head 19 which is bolted or welded to the body at the flange 21. The body 15 has a plurality of inlet nozzles 23 and a plurality of outlet nozzles 25 distributed around its periphery. Typically, there are four inlet nozzles 23 interspaced in pairs between four outlet nozzles 25. The inlet nozzles 23 are shown in the drawings at the same level as the outlet nozzles 25. Reactors in which the inlet nozzles are at levels above or below the outlet nozzles are within the scope of equivalents of this invention.

In the lower region of body 15 there is a nuclear core 27. This core includes fuel assemblies 29 including fuel rods 32 and thimbles 31 for receiving control rods (not shown). The fuel assemblies 29 are mounted between upper core plate 33 and lower core plate 35. The control rods are mounted in clusters and include rod clusters (RCC's), which have a high absorption cross-section for neutrons, grey rod clusters, which have a lower absorption cross-section for neutrons, and water-displacement rod clusters (WDRC's). The RCC's serve to shut down the reactor or to reduce its thermal power output. The grey clusters serve for load follow. The WDRC's displace the coolant in thimbles which do not receive RCC's or grey rod clusters. Such displacement takes place during the earlier part of the fuel cycle of the reactor, typically during about the first 60% of the fuel cycle.

The upper part of the body 15 contains the upper internals 37 and the calandria 39. All fixed members above the core are sometimes referred to as "upper internals" in the nuclear art. In this case it appears desirable in the interest of clarity to refer to the calandria as a separate member. The upper internals 37 include the vertical guides 41 (FIG. 3A) for the RCC's and grey control-rod clusters, and the vertical guides 43 for the WDRC's. The RCC's and grey control-rod clusters are mounted on cruciform structures 40 and the guides 41 for these rods are hollow cruciform cans. The guides 43 for the WDRC's are of generally rectangular or square cross-section with their corners truncated, and strictly may be described as octagonal cans. The sides 38 of the WDRC guides 43 are encompassed by projecting arms of four RCC or grey-rod guides 41 and extend parallel to these arms. Plates 45 having coaxial holes 47 extend vertically internally along the guides 43. The plates 45 serve as supports for the WDRC's which are guided along the holes 47. The vertical side walls 49 and 51 (FIG. 1) of the guides 41 and 43 are substantially imperforate but the guides are open at their tops and bottoms. There may be small holes 53 and 55 (FIG. 1) near the tops of guides 41 and 43 for the purpose of stabilizing or equalizing the pressure of the coolant. While reactors in which the walls 49, 51 of the guides 41, 43 are substantially imperforate has unique advantages, there may be situations in which these walls may be perforate and reliance is placed on the pressure of the coolant to confine the coolant to substantially reduce flow. Perforate guides are shown in application Ser. No. 490,097, filed concurrently herewith to Luciano Vernosei for "Nuclear Reactor", and assigned to Westinghouse Electric Corporation. Reactors in which perforate guides are used is within the broader scope of equivalents of this invention.

Figure 4:
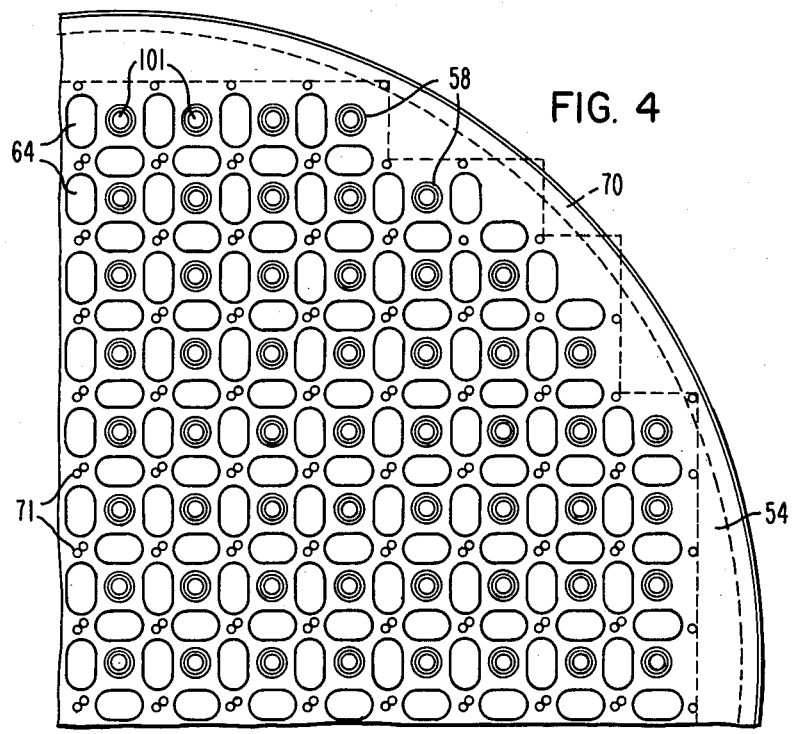
FIG. 4 is a fragmental plan view of the lower plate of the calandria as seen from the direction IV—IV of FIG. 1.
Figure 5:
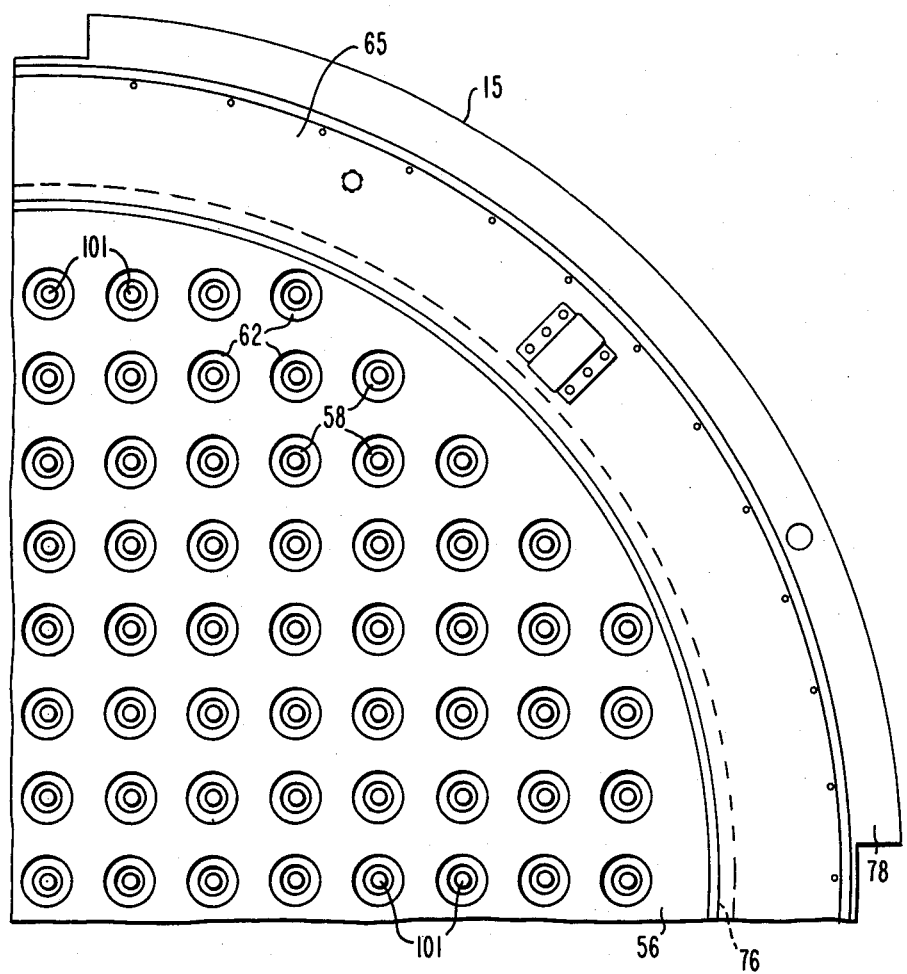
FIG. 5 is a fragmental plan view of the upper plate of the calandria as seen from the direction V—V of FIG. 1.

The calandria 39 (FIG. 6) is disclosed in Veronesi. It includes a lower generally horizontal support plate 54 (FIG. 4) and an upper generally horizontal support plate 56 (FIG. 5). Between these plates 54 and 56, generally vertical hollow members 58 are supported. The hollow members 58 typically are tubes of circular cross-section. They are secured by fillet welds 60 (FIG. 6) in counterbores 62 in the upper plate 56 and are screwed to lower plate 54. The hollow members 58 are slightly tapered where they join the lower plate 54. The lower plate 54 has holes 64 which typically have a racetrack or oval shape. Typically each hollow member 58 is surrounded by oval holes 64. The plate 54 also has pin holes 71 which serve to center the guides 41 and 43. The guides have pins (not shown) at the top which enter holes 71.

Figure 6:
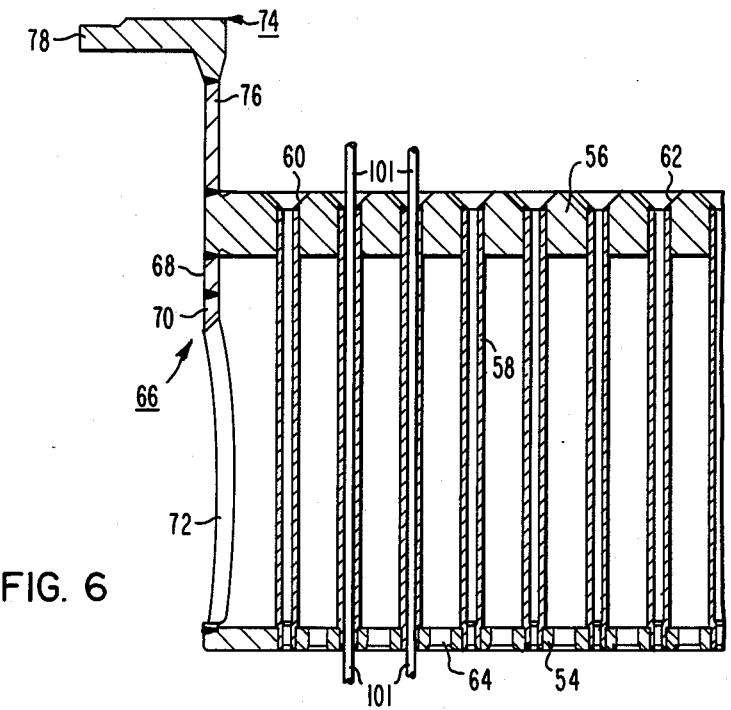
FIG. 6 is a fragmental view in longitudinal section of the calandria.

The lower and upper plates 54 and 56 are circularly cylindrical and the hollow members 58 are substantially uniformly spaced in the circularly cylindrical volume defined between the plates 54 and 56. The volume between the plates is enclosed in a shell 66 (FIGS. 1, 6). The shell 66 is of composite structure including a short annular strip 68 and a longer annular strip 70. The strip 68 is welded between the upper plate 56 and the longer strip 70. The longer strip 70 contains openings 72 which are coaxial with the openings 61 in the barrel 57 and which are spaced to mate with the opening 61. The shell 66 is closed opposite the inlet nozzles 23 (FIG. 1).

A supporting cylinder or shell 74 extends from the upper support plate. The cylinder 74 is composite including a lower cylindrical strip 76 and an upper member including a flange 78. (See also FIG. 1.) The strip 76 is welded at its lower end to the upper plate 56 of the calandria and the flanged member 78 is welded to the upper end of the strip 76. The cylinder 74 is coextensive with the shell 66.

Figure 2:
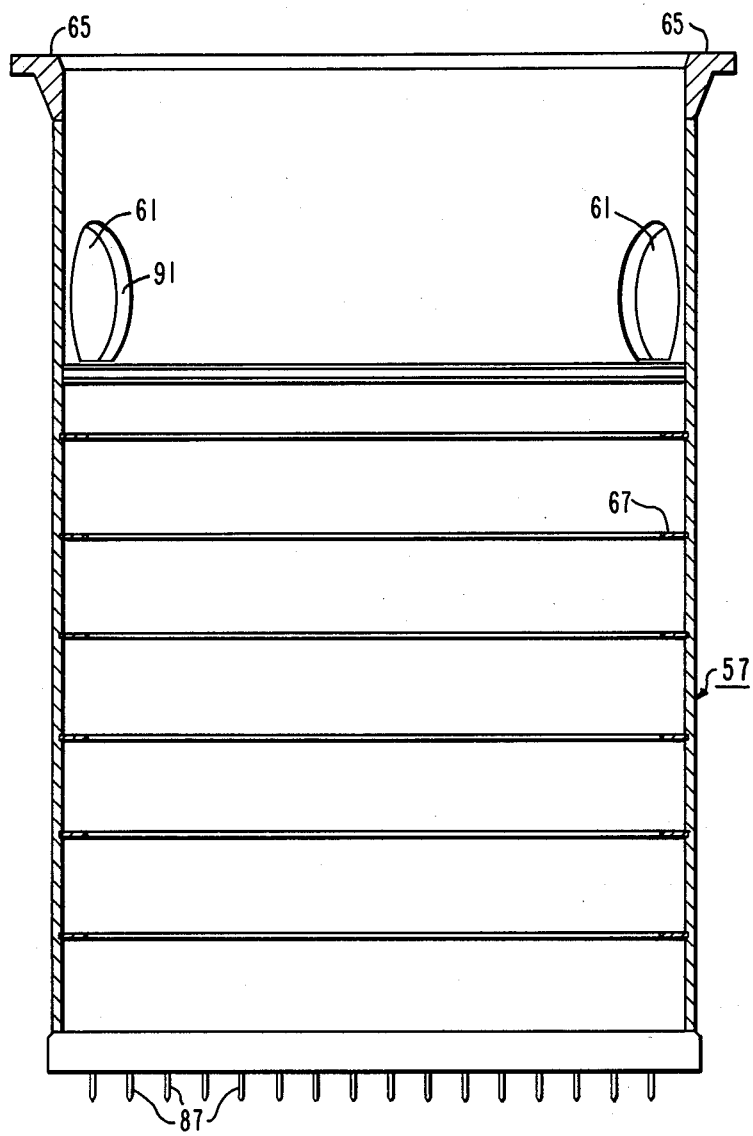
FIG. 2 is a view in longitudinal section of the inner barrel assembly for the upper internals and the calandria of the reactor shown in FIG. 1.

The upper internals 37 and the calandria 39 are contained in a barrel or shell 57 (FIG. 2). The barrel 57 is circularly cylindrical and it has holes 61 below the top which are shaped to mate with the rims of contiguous outlet nozzles 25 and with the holes 72 in the shell 66 of the calandria. The holes 61 are coaxial with the outlet nozzles 25. The barrel 57 has a flange 65 at the top; at its lower end the barrel 57 supports the upper core plate 33.

Figure 3:
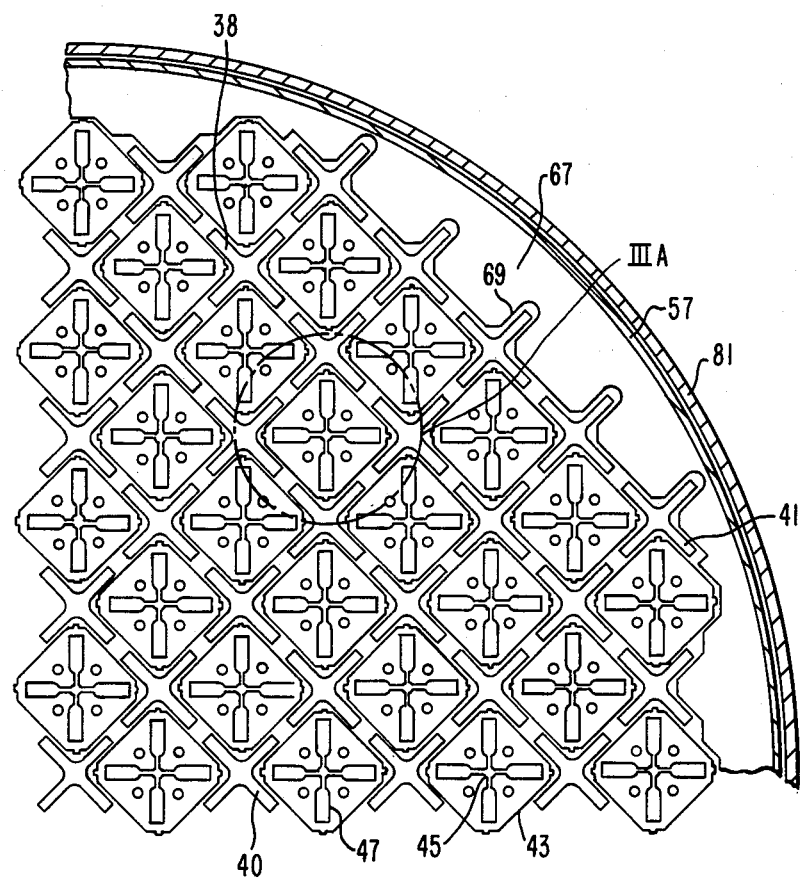
FIG. 3 is a plan view of the upper internals as seen from the direction III—III of FIG. 1.
Figure 3A:
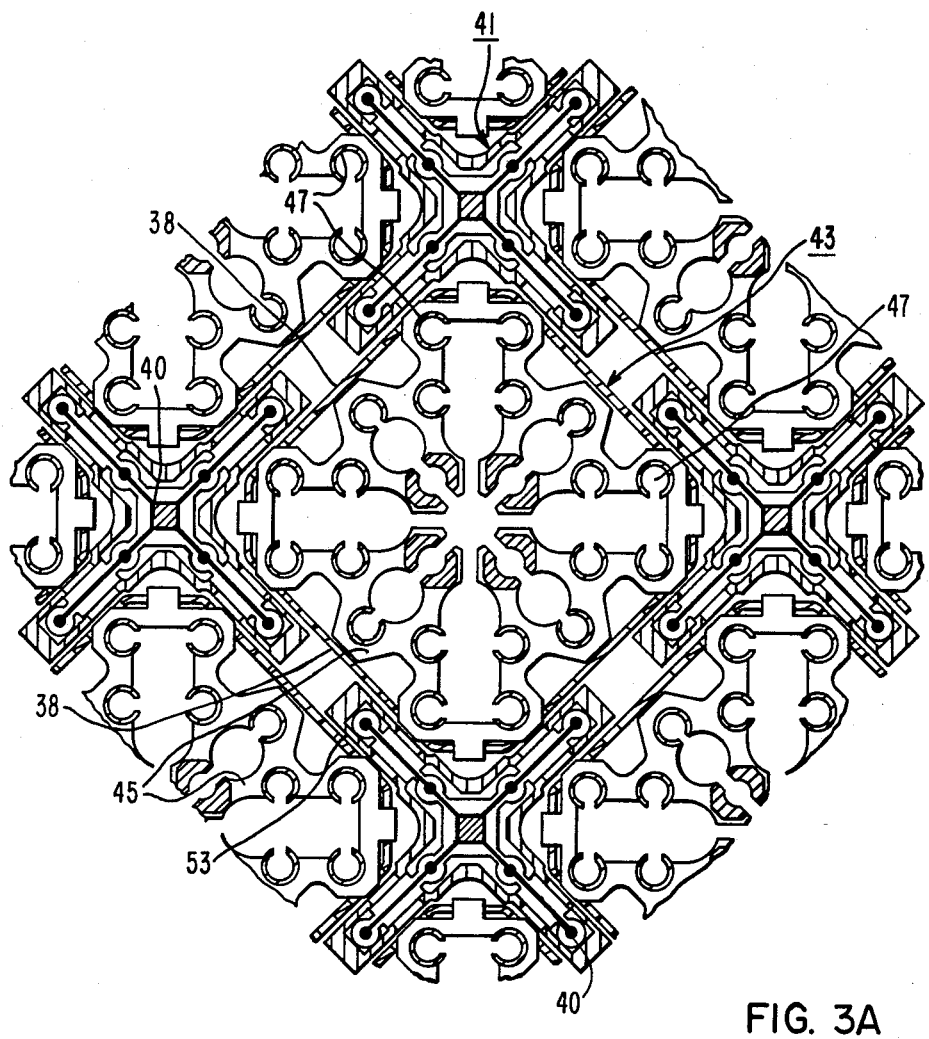
FIG. 3A is a fragmental plan view of the portion of FIG. 3 in circle IIIA.

The guides 41 and 43 are closely packed except near the periphery. Coolant flowing from the core 27 into the spaces between the guides therefore has a high velocity and tends to flow towards the periphery. The pressure of this coolant decreases from the bottom of the upper internals 37 to the top. To suppress transverse flow of coolant under the pressure between the closely spaced guides 41 and 43 and the relatively free volume at the periphery of the upper internals 39, horizontal former plates (FIGS. 1, 2) extend along the barrel 57. The plates 67 are spaced a short distance from the outer boundary of the upper internals 37. The pressure of the coolant is thus distributed so that the coolant outside of the guides 41, 43 flows upwardly about the guides and upwardly through the gaps between the formers 67 and the boundary 69 of the guide assembly (FIG. 3).

The core 27, upper internals 37 and calandria 39 are enclosed in an outer barrel 81 (FIG. 1). The lower core plate 35 is mounted on the lower end of this barrel. At its upper end the barrel 81 has a flange 85. The barrel has openings shaped to mate with the boundaries of the openings 61 in the barrel 57 and coaxial with the contiguous outlet nozzles 25.

The core 27, the upper internals 37, and the calandria 39 are mounted generally coaxially. The upper core plate 33 has pins 87 (FIGS. 1, 2) which engage and center the fuel assemblies 29. The cylinder 76 and the shell 60, the barrel 57 and the barrel 81 are mounted generally coaxially with each other and with the core 27, the upper internals 37 and the calandria 39. The flange 85 rests on a ledge 89 in the inner surface of body 15. The flange 65 of barrel 57 is above flange 85 and a spring (not shown) is interposed between these flanges.

The flange 78 is disposed upon flange 65. The shell 66, the barrel 57 and the barrel 85 are oriented circumferentially so that the boundaries 91 and 93 of the openings 72 and 61 mate with each other, the boundaries 93 (FIG. 1) of the openings 61 in barrel 57 mate with the boundaries 95 of the openings in barrel 81, and the boundaries 95 of the openings in barrel 81 mate with the inner rims 97 of the outlet nozzles 25. The annulus 99 between the barrel 81 and the body 15, usually referred to as the downcomer, is in communication with the inlet nozzles 23 and conducts the coolant. The coolant which flows in through the inlet nozzles flows down along the annulus 99 FIG. 1 into bowl 17, thence up through the core 27 and through the upper internals 37 into the calandria 39 where it flows generally transversely to and through the outlet nozzles 25. The joints between the boundaries 91, 93 and 93, 95 and between the boundaries 95 and the rims 97 form pressure-tight seals at the outlet nozzles so that there is minimal by-pass of flow of the coolant from the annulus 99 through the outlet nozzles 25.

As shown, the outflow channels of the outlet nozzles 25 are just above the upper internals and substantially at the level of the hollow members 58 of the calandria 39 so that the coolant which passes through the calandria flows directly out of the outlet nozzles 25. The lower plate 54 of the calandria 39 is mounted contiguous to the top of the upper internals 37 and the coolant flows into the calandria through the openings in guides 41 and 43, through the spaces between these guides and through the gaps between the formers 67 and the periphery 69 of the upper internals. The calandria 39 serves as upper support for the upper internals. In assembling the reactor 11, the head 19 is pressed downwardly so that its flange 21 engages the top of body 15. The flanges 72, 65 and 85 and the spring (not shown) between flanges 65 and 85 are compressed. The flange 21 is bolted or welded pressure-tight to the body 15. The drive rods 101 (FIG. 5) for the control rods pass through the hollow members 58 of the calandria and are protected by these members. By operation of the drive rods 101, the control rod spiders are moveable upwardly or downwardly between the bottom of the lower plate 54 of the calandria and the top of the upper core plate 33.

The plates 54 and 56 and the hollow members 58 of the calandria are composed of stainless steel. The outlet nozzles 25, typically, are about 40 inches in diameter. The hollow members 58, typically, have an outer diameter of 3½ inches, an inner diameter of 2¼ inches and a length of about 50 inches. With the hollow members 58 of this structure supported at both ends by the plates 54 and 56, the stresses produced by the transverse flow of the coolant even at a velocity of 40 ft./sec. is minimized and failure of the hollow members is precluded.

While preferred embodiments of the invention have been disclosed herein, many modifications thereof are feasible. This invention is not to be restricted except insofar as is necessitated by the spirit of the prior art.

We claim:

1. A nuclear reactor including a vessel, a nuclear core within said vessel, control-rod assemblies within said vessel, said control-rod assemblies including vertical control-rod guide means in a plenum vertically above said core, said control-rod assemblies also including control-rod clusters, each said cluster including a plurality of control rods suspended from a spider, said cluster being movable to move its said control rods between said guide means and said core, and a drive rod connected to each said cluster for so moving said each cluster, said vessel having at least an inlet nozzle for supplying a coolant through said core, the inflowing coolant after passing through said core flowing predominantly through said guide means generally vertically, a calandria in the path of said outflowing coolant, from said guide means, said calandria including a plurality of hollow members, an upper support for said members perforate to the opening within said members and a lower support, said calandria being mounted with its lower support above and on said guide means and with said drive rods only and not said control rods passing through said hollow members, said lower support being perforate to the coolant flowing out of said guide means, said vessel having at least an outlet nozzle with a generally horizontal coolant outflow channel, said outflow channel being substantially at the level of said calandria so that the coolant flowing into said calandria flows generally transversely over the outer surfaces of said hollow members and out through said outflow channel.

2. The reactor of claim 1 wherein the hollow members are so constructed that the stresses in said hollow members resulting from the flow of coolant transversely through said members are substantially below the level at which failure of the hollow members results from the transverse flow of the coolant through them at a high rate.

3. A nuclear reactor including a vessel, a nuclear core within said vessel, control-rod assemblies within said vessel, said control-rod assemblies including vertical control-rod guide means in a plenum vertically above said core, said control-rod assemblies also including control-rod clusters, each said cluster including a plurality of control rods suspended from spiders, said cluster being movable to move its said control rods between said guide means and said core, and a drive rod connected to each said cluster for so moving each said cluster, said vessel having at least an inlet nozzle for supplying a coolant through said core, the inflowing coolant after passing through said core flowing predominantly through said guide means generally vertically, a calandria in the path of said outflowing coolant, said calandria including a plurality of hollow members, an upper support for said members perforate to the opening within said members and a lower support, said calandria being mounted with its lower support above and on said guide means and with only said drive rods and not said control rods passing through said hollow members, said lower support being perforate to the coolant flowing out of said guide means, said vessel having at least an outlet nozzle with a generally horizontal coolant outflow channel, said coolant flowing into the calandria flowing generally transversely over the outer surfaces of said hollow members and out through said outflow channel, said outflow channel being so spaced with respect to said calandria that there is no substantial pressure drop between the coolant flowing out of the calandria and the coolant flowing into said outflow channel.

4. A nuclear reactor including a vessel, a nuclear core within said vessel, control-rod assemblies within said vessel, said control-rod assemblies including vertical control-rod guide means in a plenum vertically above said core, said control-rod assemblies also including control-rod clusters, each said cluster including a plurality of control rods suspended from a spider, each said cluster being movable to move its said control rods, between said guide means and said core, and a drive rod connected to each said cluster for so moving said each said cluster, said vessel having at least an inlet nozzle and an outlet nozzle with a generally horizontal coolant outflow channel for circulating a coolant through said core, the inflowing coolant after passing through said core flowing predominantly through said guide means generally vertically, said outflow channel being substantially at a level just above the upper end of said guide means, a calandria in the path of said outflowing coolant, said calandria including a plurality of hollow members, an upper support for said members perforate to the opening within said members and a lower support, said calandria being mounted with its lower support above and on said guide means and with only said drive rods and not said control rods passing through said hollow members, said lower support being perforate to the coolant flowing out of said guide means, the coolant flowing out of said guides flowing directly out of said outflow channel passing generally transversely over the outer surfaces of said hollow members.

5. The nuclear reactor of claim 3 wherein the vessel includes a generally cylindrical body and a head, the calandria includes a supporting flanged cylinder extending from the top thereof, and the flange of the cylinder is secured between the head and the body.

6. The nuclear reactor of claim 3 wherein the vessel includes a generally cylindrical body and a head, said body having an internally extending lip, and wherein the guide means, the core, and a substantial portion of the calandria are encircled by a first barrel having a first flange and the guide means and the calandria are encircled by a second barrel having a second flange and the calandria has a cylinder having a third flange extending from the top thereof, the first and second barrels and the cylinder being mounted generally coaxially with the first, second and third flanges compressed between the lip and the head.

7. The nuclear reactor of claim 6 wherein the first barrel and the body of the vessel define an annulus communicating with the inflow channel of the inlet nozzle through which the inflowing coolant is conducted, there being means preventing the flow of coolant into the outflowing channel between the annulus and the outlet nozzle.

8. The nuclear reactor of claim 7 wherein the flow channel of the inlet nozzle is substantially at the same level as the flow channel of the outlet nozzle.

9. The nuclear reactor of claim 8 wherein the length of the portions of said hollow members between the upper and lower support is at least equal to the cross dimension of the outlet nozzle along the hollow members.

10. The nuclear reactor of claim 3 wherein the volume of the calandria between the upper and lower supports in such that the pressure distribution in the coolant within the calandria is substantially uniform whereby the flow of coolant in the calandria does not produce materially non-uniform pressure distribution in the core.

11. The nuclear reactor of claim 9 wherein the inlet nozzle is also at the level of the calandria.

12. The nuclear reactor of claim 11 wherein the guides of the upper internals are enclosed by a shell having former plates spaced along the length thereof, said former plates extending toward the periphery of said guides, there being a small gap between each of said former plates and said periphery along which coolant flows upwardly, whereby the pressure of said coolant within and surrounding said guides is equalized.

13. The nuclear reactor of claim 12 wherein the walls of the guides are substantially imperforate to coolant which would flow laterally out of said guides so as to suppress substantial flow of coolant laterally out of said guides but each said guides is perforate at its lower and upper ends to permit the inflow of coolant vertically from said core into said each guide and the outflow generally vertically of the coolant from said guide means.

14. The nuclear reactor of claim 3 wherein the walls of the guide means are substantially imperforate to coolant latterally out of said guide means so as to suppress substantial flow of coolant laterally out of said guide means but said guide means are perforate at its lower and upper ends to permit the inflow of coolant vertically from said core into said guide means and the outflow vertically of the coolant from said guide means.

15. The nuclear reactor of claim 4 wherein the walls of the guide means are substantially imperforate to coolant latterally out of said guide means so as to suppress substantial flow of coolant laterally out of said guide means but said guide means are perforate at its lower and upper ends to permit the inflow of coolant vertically from said core into said guide means and the outflow vertically of the coolant from said guide means.

16. A nuclear reactor including a vessel, a nuclear core within said vessel, control-rod clusters each cluster including a plurality of control rods for controlling said reactor suspended from a spider, upper internals mounted on said core vertically above said core, said upper internals including guides, a calandria having a plurality of hollow members mounted between upper and lower supports perforate to said hollow members, said calandria being mounted on said upper internals vertically above said upper internals, with said lower support on said upper internals, a drive rod, connected to each said cluster, each said drive rod only and not said control rods passing moveably through a said hollow member of said calandria and suspending the cluster connected to it movable by said drive rod between a position in which, said control rod clusters are within said guides and said spider is near said lower support and a position in which the spider of said each cluster is near said core and said control rods are within said core, said vessel having at least an inlet nozzle and an outlet nozzle, said outlet-nozzle having a generally-horizontal coolant outflow channel, said outflow channel being substantially at the level of said hollow members, and means for conducting coolant from said inlet nozzle in succession through said core, said upper internals, said hollow members and said outflow channel, said coolant being conducted generally vertically through said core and upper internals, generally transversely through said hollow members and generally horizontally through said outflow channel.

17. A nuclear reactor including a vessel, a nuclear core within said vessel, control-rod clusters each cluster including a plurality of control rods for controlling said reactor suspended from a spider, upper internals mounted on said core vertically above said core, said upper internals including guides, a plurality of hollow members mounted on said upper internals vertically above said upper internals, a drive rod, connected to each said cluster, only each said drive rod and not said control rods passing moveably through a said hollow member and suspending the cluster connected to it movable by said drive rod between a position in which, said control rod clusters are within said guides and said spider is near said lower support and a position in which the spider of said each cluster is near said core and said control rods are within said core, said vessel having at least an inlet nozzle and an outlet nozzle, said outlet-nozzle having a generally-horizontal coolant outflow channel, said outflow channel being substantially at the level of said hollow members, and means for conducting coolant from said inlet nozzle in succession through said core, said upper internals, said hollow members and said outflow channel, said coolant being conducted generally vertically through said core and upper internals, generally transversely through said hollow members and generally horizontally through said outflow channel.

18. A nuclear reactor including a vessel, a nuclear core within said vessel, a plurality of control rods for controlling said reactor, upper internals mounted on said core vertically above said core, said upper internals including guides for said control-rod rods, a plurality of generally vertical hollow members mounted on said upper internals vertically above said upper internals, a plurality of drive rods connected to said plurality of control rods, each drive rod connected to certain of the control rods of said plurality of control rods, only said drive rods and not said control rods passing moveably through said hollow member and suspending said certain of said control rods connected to said drive rods movable by said drive rods between a position in which said control rods are within said guides and a position in which said control rods are wholly within said core, said vessel having at least an inlet nozzle and an outlet nozzle, said outlet nozzle having a generally horizontal coolant outflow channel, said outflow channel being substantially at the level of said hollow members, and means for conducting coolant from said inlet nozzle in succession through said core, said upper internals, said hollow members and said outflow channel, said coolant being conducted generally vertically through said core and said upper internals, generally transversely through said hollow members and generally horizontally through said outflow channel.

19. A nuclear reactor including a vessel, a nuclear core within said vessel, control rods for controlling said core, control-rod guide means mounted within said vessel vertically above said core, drive rods, connected to said control rods, for driving said control rods between said control-rod guide means and said core, a plurality of generally vertical tubes mounting vertically above said guide means within said vessel, only said drive rods and not said control rods passing moveably through said tubes, means for conducting a coolant through said vessel, said conducting means including at least an inlet nozzle and an outlet nozzle, said coolant being conducted in the normal operation of said reactor into said vessel through said inlet nozzle and then generally vertically upwardly in succession through said core and said control-rod guide means and then generally horizontally past said tubes and out through said outlet nozzle, said outlet nozzle being at the level of said tubes and subtending said tubes along the predominant portion of their lengths.

* * * * *